United States Patent [19]

Seebach

[11] Patent Number: 5,453,759

[45] Date of Patent: Sep. 26, 1995

[54] POINTING DEVICE FOR COMMUNICATION WITH COMPUTER SYSTEMS

[76] Inventor: Jurgen Seebach, 1001 Bridgeway/Ste. 506, Sausalito, Calif. 94965

[21] Appl. No.: 364,421

[22] Filed: Dec. 27, 1994

Related U.S. Application Data

[63] Continuation of Ser. No. 98,580, Jul. 28, 1993, abandoned.

[51] Int. Cl.⁶ ............................................... G09G 3/02
[52] U.S. Cl. ................................. 345/158; 345/179
[58] Field of Search ............................. 345/158, 161, 345/157, 179, 156; 341/20, 22; 401/7, 209, 221

[56] References Cited

U.S. PATENT DOCUMENTS

| | | | |
|---|---|---|---|
| 684,685 | 10/1901 | Gerst | 401/7 |
| 688,834 | 12/1901 | Deck | 401/221 |
| 2,509,037 | 5/1950 | Niizawa | 401/7 |
| 2,946,311 | 7/1960 | Craig | 401/209 |
| 4,642,459 | 2/1987 | Caswell | 345/179 |
| 4,654,648 | 3/1987 | Herrington | 345/179 |
| 4,654,700 | 3/1987 | Baer | 345/179 |
| 4,988,981 | 1/1991 | Zimmerman et al. | 345/158 |

FOREIGN PATENT DOCUMENTS

| | | | |
|---|---|---|---|
| 2-268315 | 11/1990 | Japan . | |
| 2173597 | 10/1986 | United Kingdom | 341/20 |

*Primary Examiner*—Richard Hjerpe
*Assistant Examiner*—Vivian W. Chang

[57] ABSTRACT

A device, which sits on a finger or the fingertip and allows communication with computer systems by finger-pointing to monitor images. Embedded into a body (10) are electronic elements, e.g., (11) and (9). Pointing with the finger to a certain image displayed on a monitor's screen causes the electronic elements to return a signal to the controlling software application through hardware interface electronic. The software application recognizes which of the displayed images has been selected by finger-pointing. The software application than starts corresponding actions.

2 Claims, 2 Drawing Sheets

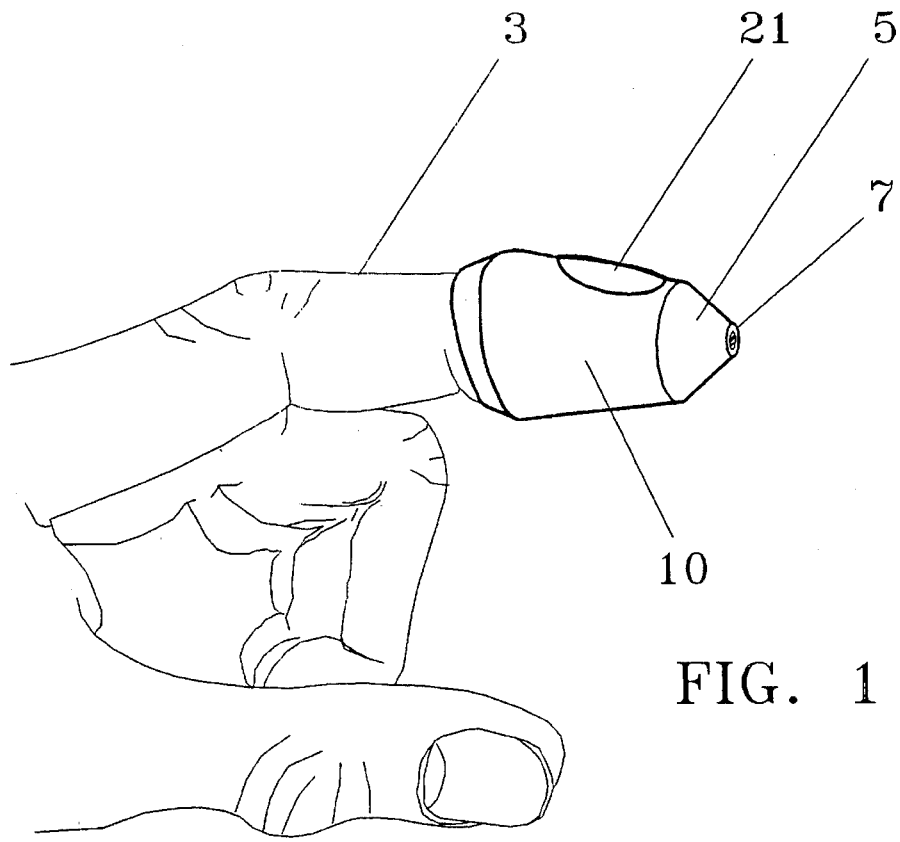
FIG. 1
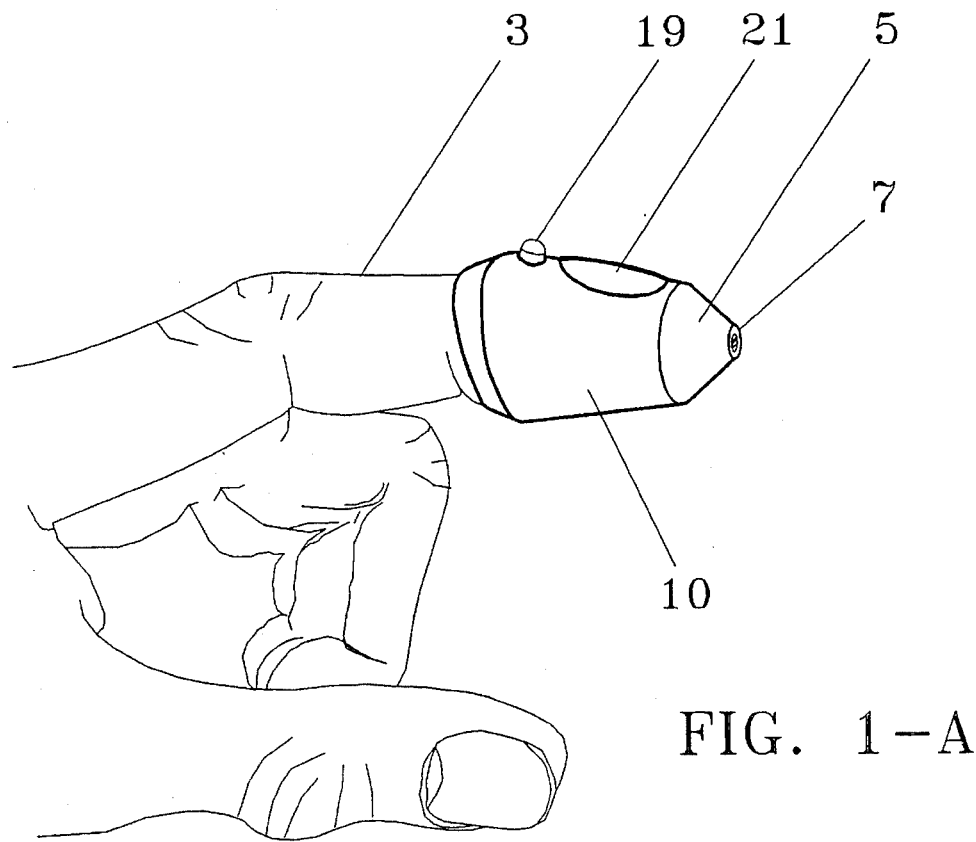
FIG. 1-A

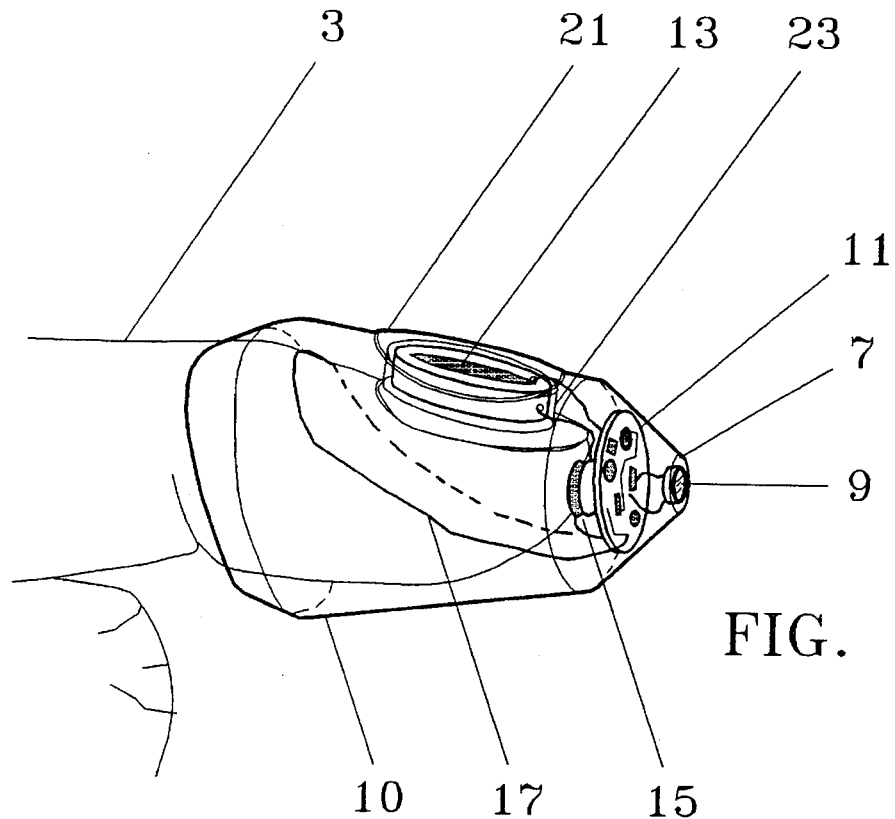
FIG. 2
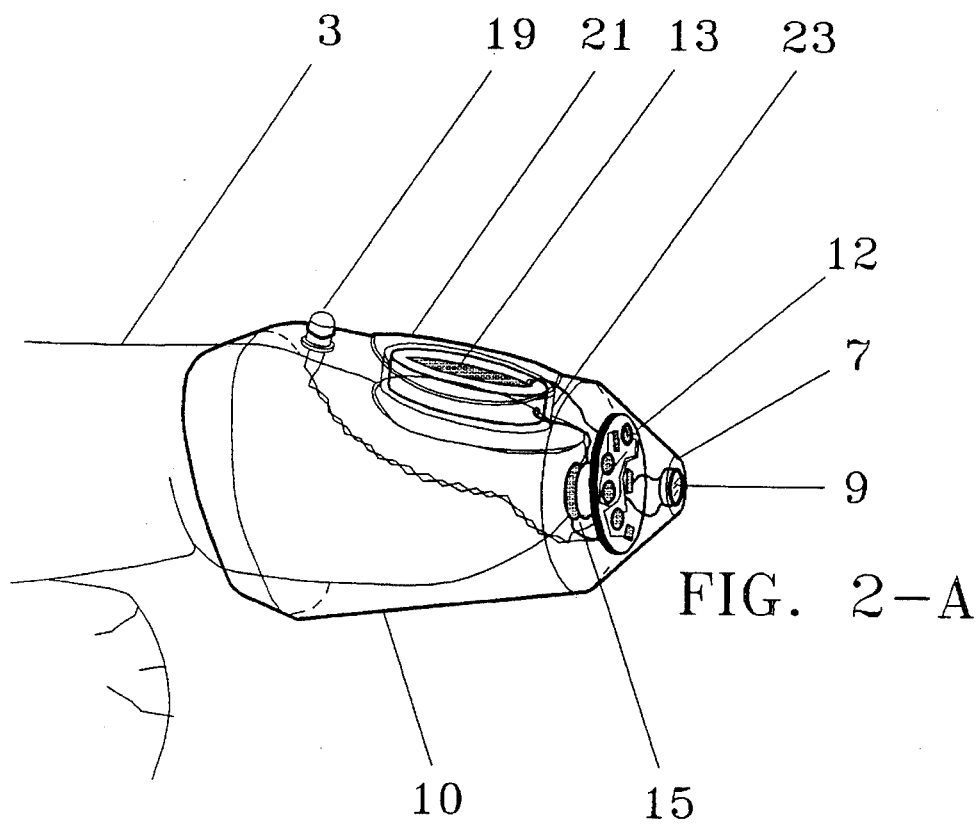
FIG. 2-A

POINTING DEVICE FOR COMMUNICATION WITH COMPUTER SYSTEMS

This is a continuation of Ser. No. 08/098,580, filed Jul. 28, 1993, now abandoned.

BACKGROUND—FIELD OF INVENTION

This invention relates to computer input devices used by computer operators to communicate with their computer and with their software applications.

BACKGROUND—DESCRIPTION OF PRIOR ART

The best known computer input device is the keyboard. It became a vital part of the computer shortly after this machine was born. It is still an excellent and indispensable tool to communicate with software applications. It enables software developers to create countless data application programs from simple word processors up to sophisticated financial/mathematic software packages. This way the computer replaced the typewriter and other mechanical office machines. However, it kept the keyboard style of these machines.

When the world of graphics and drawings discovered the computer the keyboard principally failed to provide as input device. Pressing keys can not replace a pencil. The keyboard as input device does not allow a natural flow of human drafting creativity to the computer's monitor. Therefore digitizers entered the computer world. The most widely known are the "Mouse" and the digitizing tablet.

Such devices and similar ones allow the operator to transfer his hand's motion into proportional movement of a cursor displayed on his computer's monitor. Working with the mouse requires the operator to hold the mouse in his hand and move it over a horizontal area of his desk. Simultaneously he has to watch the monitor for the cursor movement. When he has positioned the cursor at the desired screen location he must press a key to enter the position into the computer. The computer than executes the action defined by the current software. Working with the mouse requires talent and weeks of practice to coordinate hand, arm and cursor motion properly and efficient. Besides that, mouse as well as tablet require extra space on the desk or computer table. The latter disadvantage becomes reduced by using a trackball device. Because this type of input device is operated by ones' fingertips only, it gives the average computer user an even harder time to become used to it.

Nevertheless, these input devices made powerful graphics software possible and CAD, Computer Added Design, started to conquer the world, replacing drafting boards and machines.

However, new software applications have been developed and have entered the market. They cannot be served adequately by existing input devices, like mouse and tablet and not at all by the keyboard. One sample of such applications is software that works with windows. Other samples of such applications represent software, which simulates all type of mechanical and electronic instruments, even machinery. This software puts complete front panels on screen, e.g., an oscilloscope or the dashboard of a light airplane. All the mechanical keys and buttons the real equipment would have are displayed as fictitious elements.

There are even test and demonstration applications, which do not just copy real world equipment. They rather represent new horizons for computer software applications.

All of these applications have one property in common: they display buttons on the screen and require the operator to respond by pressing a selected button. Since the buttons are pictures only, the operator cannot activate them with his finger tip, which is the natural way for humans to press a button. He needs a technical aid, acting as pointing device.

The above described pointing devices are imperfect for this purpose, because they do not allow to perform this task by following the natural tendency, which is to use the finger tip. That is no surprise, because they are designed as input devices for graphic respectively data input and not for simulating key-pressing actions.

Recognizing that touching it is the natural way to press a button—even a fictitious one—has lead to the development of monitor masks. Such mask has to be manufactured for a certain software application and monitor size and represents a matrix, which the computer system reads. It has to be attached to the front area of the monitor tube. Since the mask is made of transparent material, displays remain visible. Pressing with the fingertip on this mask at an area behind which a fictitious button is displayed, starts the desired computer action.

The problems with this type of accessory are:

- It has to be attached to the monitor by the end-user. His skills define the quality of the assembly work.
- It has to be manufactured for each different application.
- Although transparent the mask absorbs a portion of the light emitted by the screen.
- One attempts to compensate for loss of brightness by adjusting the brightness control to a higher value. That shortens the life time of the monitor's screen.

One more device that also comes closer to pointing with a finger is a stylus. It is a pencil shaped device, hand held and connected to the computer system. Pointing with the stylus tip to a fictitious button on the monitor screen will activate the action programed to this button. The drawback is, that this pencil shaped instrument has been originally designed for free hand sketching to a monitor or TV screen and its use for button pressing is a makeshift, too.

More disadvantages of the stylus are:

- It is uncomfortable to target a point on the vertical-oriented monitor screen correctly with the hand-held stylus, since the approaching hand and arm is nowhere supported.
- Using the stylus does not allow natural flow of motion for button pressing.
- Shifting between computer work and work, e.g., on equipment on a test bench or on papers on a desk, always requires one to drop the stylus by placing it somewhere. One than grabs something else, drops it and looks for the stylus again, wondering frequently where it has hidden this time on the workbench or desk.
- Performing flow of motion against nature is exhausting and stressing over the length of an entire workday.

OBJECTS AND ADVANTAGES

Accordingly, several objects and advantages of my pointing device are:

(a) to provide a device, which allows computer recognized finger pointing to images displayed on a monitor screen.

(b) to provide a device, which accomplishes signal recognition by said finger-pointing by using known electronic circuitry and software algorithm.

(c) to provide a pointing device, which does not require monitor modifications.

(d) to provide a pointing device, which does not require additional space on desk or workbench to function.

(e) to provide a pointing device, which is the match between the physical request to activate a button and the natural human reaction to do so by hitting the button with a fingertip.

(f) to provide a pointing device, which has not to be put aside in order to do something else with the hand.

(g) to provide a pointing device, which allows fatigue-free work with simulated buttons displayed on monitor screens.

Still further objects and advantages will become apparent from a consideration of the ensuing description and drawings.

Drawing Figures

FIG. 1 shows a typical embodiment of my pointing device worn by a finger of a hand and equipped with a transmitter for radio waves.

FIG. 1-A shows a pointing device of similar design but equipped with an light emitting component for transmitting data.

FIG. 2 and FIG. 2-A are close-ups and they show the pointing devices made of transparent material so that the enclosed technology becomes visible.

| Reference Numerals in Drawings | |
|---|---|
| 10 Body | 12 Light transmitter assembly |
| 3 Finger | 13 Battery |
| 5 Tip of body | 15 ON/OFF switch |
| — — | 17 Antenna |
| 7 Sensor window | 19 LED |
| 9 Sensor | 21 Lid for battery compartment |
| 11 RF transmitter | 23 Battery compartment |

DESCRIPTION—FIGURES

A typical embodiment of my pointing device and how to attach it to a finger of a human's hand is illustrated in FIG. 1. The pointing device consists of a body 10 which is made to fit comfortably the tip of a finger 3 of a hand. Body 10 is made of material which is none conductive and comfortable to wear. Preferred material is soft plastic or rubber. Any kind of colors can be provided.

Body 10 has a tip area 5. A sensor window 7 is located at the tip of tip area 5. The top area of body 10 includes a battery compartment 23 which is covered by a lid 21.

FIG. 2 shows my pointing device with body 10 made out of a transparent material. That makes the embedded technology visible. FIG. 2 shows a light detecting sensor 9 behind sensor window 7. Sensor 9 is connected to a RF transmitter assembly 11. RF transmitter assembly 11 is a subminiature radio wave transmitter, mounted to a printed circuit board. It reads changes in the current electrical condition of sensor 9 and transmits the new condition to a receiver.

RF transmitter assembly 11 needs a transmission range not more than 25". An antenna 17 is connected to RF transmitter assembly 11 A battery 13 provides power to RF transmitter assembly 11 and sensor 9. Button-type battery 13 fits in compartment 23.

Compartment 23 is covered by press-in lid 21. Current flows from battery 13 to RF transmitter 11 and sensor 9 through a pressure ON/OFF switch 15. This switch is located inside body 10. The tip of finger 3 inside body 10 touches and closes switch 15 when pressure is transferred to it from tip 5. That happens, when finger 3 with the pointing device points to, and tip 5 presses against the monitor screen (not shown), even for a short moment.

A receiver assembly (not shown) is required to receive the transmitted signal and feed it into the computer system. Software is required to interpret the signal. The receiver is part of hardware equipment (not shown) which is implemented into the computer system. Said hardware equipment is shaped like standard interface cards for personal computers. The receiver antenna (not shown) is attached to the monitor housing, preferable to the top or bottom area of the monitor's front panel. The hardware equipment and software is designed using generally known, art such as converting techniques for sensor signals operating techniques for hand-held styluses transmitting and receiving techniques for radio waves, and techniques for emitting and receiving light waves.

FIG. 1-A shows the pointing device equipped with a light emitting diode (LED) 19. This modification of the pointing device replaces RF transmitter 11 by a light transmitter assembly 12 shown in FIG. 2-A. FIG. 2-A shows further the connection between LED 19 and light transmitter assembly 12. Consequently this modification does not require an antenna 17. The light receiving component is placed on the top edge of the monitor's front panel (not shown). Compared with the pointing device shown in FIG. 1 and FIG. 2 no more changes are involved in this modification.

Summary, Ramifications, and Scope

Fictitious keys and buttons have become very common graphic elements in software applications. Some of these applications are used by tenth of millions of computer operators. My pointing device is the logical hardware supplement for software, which requires the user to press such fictitious buttons. The pointing device enables function calling by finger pointing for any kind of application. It does not require monitor modifications.

Furthermore my pointing device has the additional advantages in that it allows to respond with natural motion when key pressing is required by software application it does not occupy table or desk space it can remain on the fingertip even when performing other tasks it requires only standard procedures to install the hardware.

Although the description above lists many specificities, these should not be understood as limiting the scope of the invention but as merely providing ideas of some of the presently preferred embodiments of this invention.

For example, the body can be designed so that it covers not only the first finger joint, the body and tip area can have other shapes, it can be made for different finger sizes, the inside can be shaped to provide extended space for long fingernails and any kind of color and surface structure can be applied; the inside switch can be replaced by an outside switch, the battery compartment can sit at the bottom portion of the device, as energy source photovoltaic elements (solar cells) can replace the battery, for power supply and data transfer cable with light conductors and electricity conductors can be used, etc.

Thus the scope of my invention should be determined by the appended claims and their legal equivalents, rather than by the examples given.

I claim:

1. A finger-fitting device, for communicating with a remote computer system by pointing to a monitor screen, comprising:

(a) a body, shaped as a thimble to fit onto any digit of a human hand; and (b) a light detecting sensor incorporated in a tip area of said body for sensing a light-emitting spot on said monitor's screen for causing a change in an electrical output signal of said sensor when said sensor in said body is brought in close proximity to the surface of said monitor screen of said computer system; and (c) a light transmitter incorporated in said body and connected to said sensor for detecting the change of said electrical output signal of said sensor and changing its transmitting state to provide a transmission signal to said remote computer system accordingly; and (d) an electric energy means incorporated in said body comprising a battery and a switch for providing electric current to said sensor and said light transmitter.

2. A finger-fitting device, for communicating with a remote computer system by pointing to a monitor screen, comprising:

(a) a body, shaped as a thimble to fit onto any digit of a human hand; and (b) a light detecting sensor incorporated in a tip area of said body for sensing a light-emitting spot on said monitor's screen for causing a change in an electrical output signal of said sensor when said sensor in said body is brought in close proximity to the surface of said monitor screen of said computer system; and (c) a radio wave transmitter incorporated in said body and connected to said sensor for detecting the change of said electrical output signal of said sensor and changing its transmitting state to provide a transmission signal to said remote computer system accordingly; and (d) an electric energy means incorporated in said body comprising a battery and a switch for providing electric current to said sensor and said radio wave transmitter.

* * * * *